(12) United States Patent
Mullins et al.

(10) Patent No.: US 11,441,683 B2
(45) Date of Patent: Sep. 13, 2022

(54) HYDRAULIC FLUID PUMP AND STUFFING BOX ASSEMBLY FOR SAME

(71) Applicant: GD Energy Products, LLC, Tulsa, OK (US)

(72) Inventors: Chance Ray Mullins, Tulsa, OK (US); Peter Ross Ehlers, Tulsa, OK (US); Evan Gregory Mackay, Tulsa, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 521 days.

(21) Appl. No.: 16/446,280

(22) Filed: Jun. 19, 2019

(65) Prior Publication Data

US 2020/0400234 A1 Dec. 24, 2020

(51) Int. Cl.
| | |
|---|---|
| *F16J 15/00* | (2006.01) |
| *F16J 15/26* | (2006.01) |
| *F16J 15/40* | (2006.01) |
| *F04B 53/16* | (2006.01) |
| *F16J 15/16* | (2006.01) |

(52) U.S. Cl.
CPC .............. *F16J 15/26* (2013.01); *F16J 15/406* (2013.01); *F04B 53/164* (2013.01); *F16J 15/164* (2013.01)

(58) Field of Classification Search
CPC .......... F16J 15/26; F16J 15/406; F16J 15/164; F16J 15/18; F16J 15/182; F04B 53/164
See application file for complete search history.

(56) References Cited

U.S. PATENT DOCUMENTS

| | | | |
|---|---|---|---|
| 3,815,925 A * | 6/1974 | Mattoon | E21B 33/072 277/318 |
| 5,209,459 A | 5/1993 | Jones et al. | |
| 5,538,080 A * | 7/1996 | Bassinger | E21B 33/08 166/84.2 |
| 5,755,372 A * | 5/1998 | Cimbura, Sr. | E21B 33/08 277/318 |
| 5,769,427 A * | 6/1998 | Ostrowski | F04D 29/128 277/318 |
| 6,210,103 B1 * | 4/2001 | Ramsay | F04D 29/0413 415/112 |
| 6,302,401 B1 | 10/2001 | Palmour | |
| 6,626,436 B2 * | 9/2003 | Pecht | F16J 15/3492 277/317 |
| 2003/0184018 A1 * | 10/2003 | Upton | F16J 15/3296 277/318 |

(Continued)

FOREIGN PATENT DOCUMENTS

WO 2014032812 A1 3/2014

*Primary Examiner* — Gilbert Y Lee
(74) *Attorney, Agent, or Firm* — Edell, Shapiro & Finnan, LLC

(57) ABSTRACT

A stuffing box assembly for a fluid end of a hydraulic fluid pump includes a stuffing box unit having a plunger bore configured to receive a plunger of the hydraulic fluid pump and a plurality of seals. The plunger bore extends from a first axial end of the stuffing box unit to a second axial end of the stuffing box unit. The plunger bore includes a first portion configured to receive the plurality of seals and a second portion extending between the first portion and the second axial end. The stuffing box assembly further includes a sensor coupled to the stuffing box unit and configured to determine a fluid pressure within the second portion of the stuffing box unit.

20 Claims, 4 Drawing Sheets

(56) References Cited

U.S. PATENT DOCUMENTS

| | | |
|---|---|---|
| 2008/0240949 A1 | 10/2008 | Tackett et al. |
| 2011/0052423 A1 | 3/2011 | Gambier et al. |
| 2014/0322050 A1 | 10/2014 | Marette et al. |
| 2015/0101679 A1 | 4/2015 | Forrest et al. |
| 2017/0082101 A1 | 3/2017 | Urdaneta et al. |
| 2018/0040226 A1 | 2/2018 | Zhang et al. |
| 2018/0135617 A1 | 5/2018 | Ma et al. |
| 2018/0202423 A1 | 7/2018 | Zhang et al. |

* cited by examiner

HYDRAULIC FLUID PUMP AND STUFFING BOX ASSEMBLY FOR SAME

FIELD OF THE INVENTION

The present invention relates to a hydraulic fluid pump and, more particularly, to a fluid end assembly and a stuffing box of a hydraulic fluid pump.

SUMMARY

In one embodiment, the invention provides a stuffing box assembly for a fluid end of a hydraulic fluid pump. The stuffing box assembly includes a stuffing box unit having a plunger bore configured to receive a plunger of the hydraulic fluid pump and a plurality of seals. The plunger bore extends from a first axial end of the stuffing box unit to a second axial end of the stuffing box unit. The plunger bore includes a first portion configured to receive the plurality of seals and a second portion extending between the first portion and the second axial end. The stuffing box assembly further includes a sensor coupled to the stuffing box unit and configured to determine a fluid pressure within the second portion of the stuffing box unit.

In another embodiment, the invention provides a stuffing box assembly for a fluid end of a hydraulic fluid pump. The stuffing box assembly includes a stuffing box unit having an axial bore. The axial bore is defined by a first portion configured to support a plurality of seals, a second portion, and a third portion configured to engage a stuffing nut. The first portion is positioned between the second portion and the third portion. The stuffing box assembly further includes sensing means configured to determine a fluid pressure within the second portion of the axial bore.

In yet another embodiment, the invention provides a stuffing box assembly for a fluid end of a hydraulic fluid pump. The stuffing box assembly includes a stuffing box unit having an axial bore configured to support a plurality of seals in a first portion. The axial bore includes a second portion axially spaced apart from the first portion. The stuffing box unit further includes a channel branching from the axial bore at the second portion. The stuffing box assembly further includes a sensor in fluid communication with the channel and configured to determine a fluid pressure within the second portion of the stuffing box unit.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
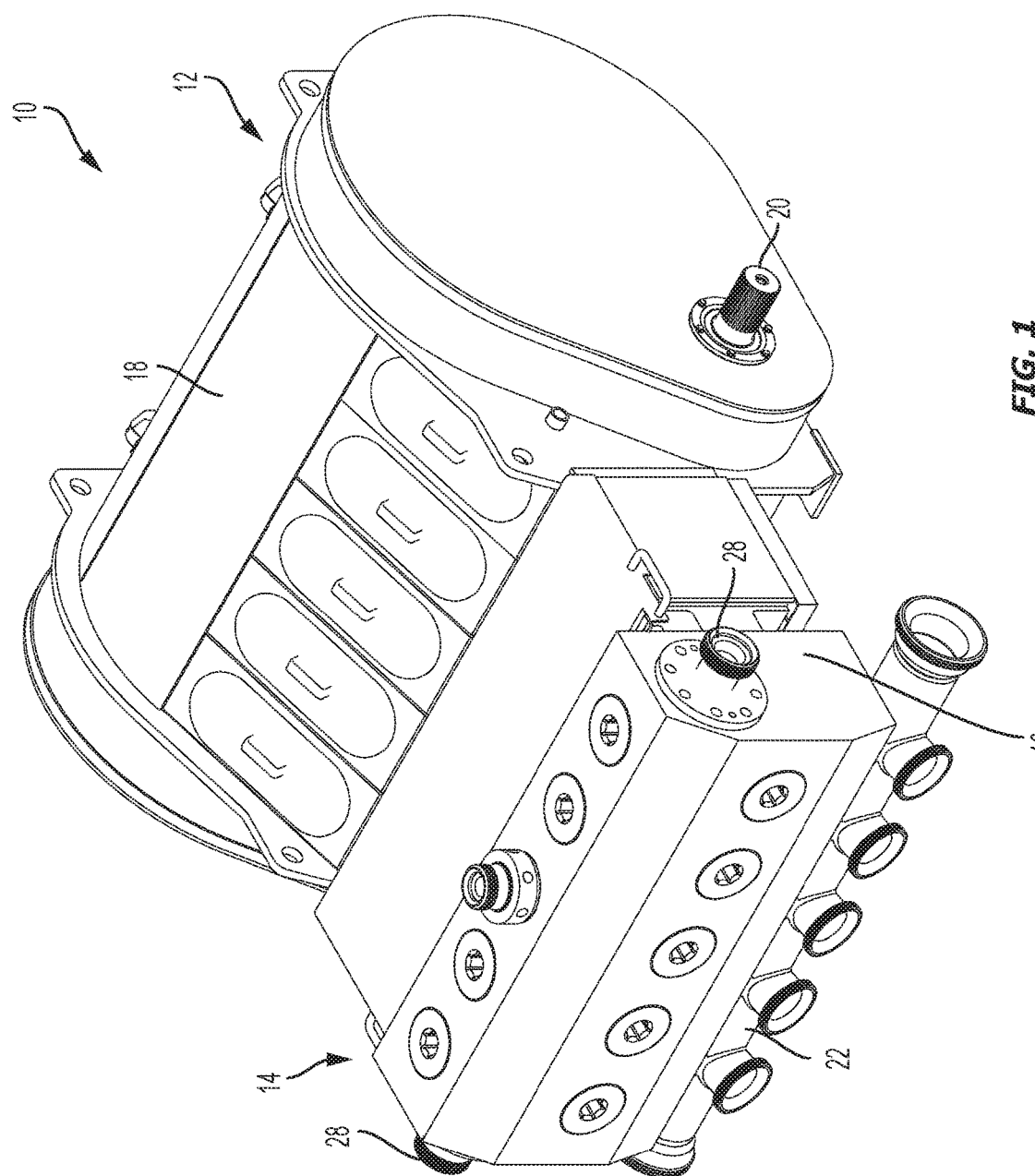
FIG. 1 is a perspective view of a hydraulic fluid pump.

FIG. 1 illustrates a hydraulic fluid pump 10 of the type often used during drilling and hydraulic fracturing operations such as hydrocarbon or oil fracturing. The hydraulic fluid pump 10 includes a power end or drive end or drive end assembly 12 that is largely enclosed within a casing 18. A fluid end or fluid end assembly 14 attaches to the drive end 12 and the casing 18 and includes at least one fluid end block 16. A drive shaft 20 extends out of the casing 18 and provides for a connection point for a prime mover such as a motor or engine. The prime mover drives the drive shaft 20 at a desired speed to power the drive end 12. The drive end 12 typically includes a transmission (e.g., gears, belts, chains, etc.) that serve to step down the speed of the drive shaft 20 to a speed appropriate for the fluid end 14. The drive end 12 includes a series of reciprocating mechanisms that in turn drives a piston or plunger (e.g., plunger 46 shown in FIG. 2) within a respective bore of the fluid end block 16 to pump a fluid.

Figure 2:
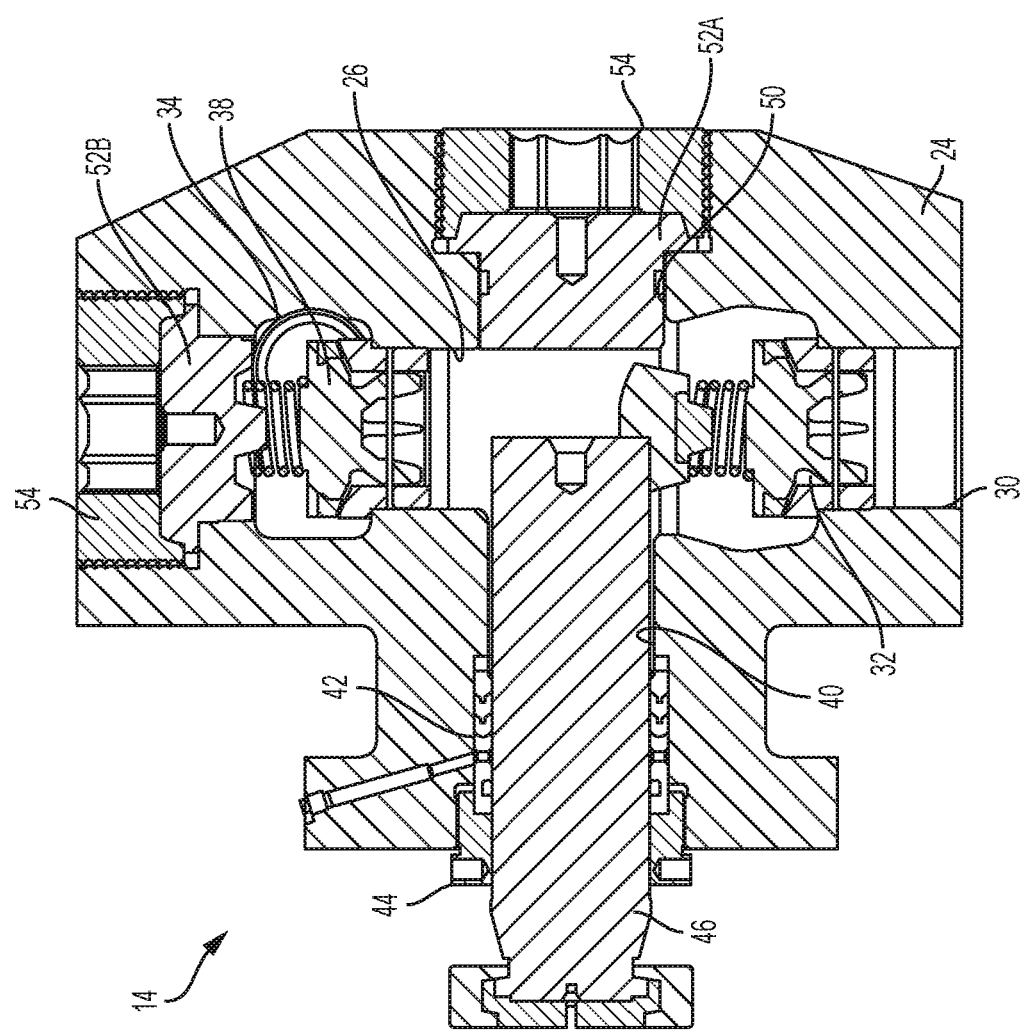
FIG. 2 is a cross-sectional view of a fluid end of a hydraulic fluid pump.

The fluid end 14 is better illustrated in FIG. 2. A housing 24 defines the main body of the fluid end assembly 14 surrounding an interior volume 26. An inlet manifold 22 (FIG. 1) distributes fluid to an inlet bore 30 of each fluid end block 16. An inlet valve 32 is positioned in the inlet bore 30 to control flow from the inlet manifold 22 into the interior volume 26 of the fluid end 14, and more specifically, the interior volume 26 of the housing 24. An outlet bore 34 directs pressurized fluid from the interior volume 26, past an outlet valve 38, and to an outlet manifold integrated into the fluid end 14 and having an outlet 28 (FIG. 1) from the fluid end 14. The outlet manifold 28 is in fluid communication with the fluid end block 16 via the outlet bore 34 and outlet valve 38. As shown, the inlet and outlet bores 30, 34 are axially aligned with one another. In other embodiments, the inlet and outlet bores 30, 34 may be offset from one another or aligned with one another at an angle.

A plunger bore 40 extends perpendicular to the inlet and outlet bores 30, 34 and supports a packing arrangement 42 having a plurality of seals and packing retainer or packing nut or stuffing nut 44. In other embodiments, the plunger bore 40 may be otherwise angled relative to the inlet and outlet bores 30, 34. The reciprocating plunger 46 is movable within the plunger bore 40 relative to the packing arrangement 42 and the packing retainer 44 to pressurize fluid within the interior volume 26 and to the outlet manifold 28. A service bore 50 is formed in the housing 24 parallel with and axially aligned with the plunger bore 40 and provides access to the interior volume 26 of the housing 24 without removal of the plunger 46, or the valves 32, 38. The service bore 50 may additionally provide access for insertion and removal of the plunger 46 and/or the inlet valve 32 from the remainder of the pump 10.

As shown, both the outlet bore 34 and the service bore 50 include valve covers 52A, 52B and retainers 54. The valve covers 52A, 52B seal against the housing 24 to prevent fluid from the interior volume 26 from passing through the respective bores 34, 50. Each retainer 54 applies a force to the respective valve cover 52A, 52B to hold the valve cover 52A, 52B in a sealing position against the housing 24. When the reciprocating plunger 46 increases the pressure of the fluid within the interior volume 26 of the housing 24, a force is applied on the valve covers 52A, 52B. The retainer 54 applies a preload to the valve cover 52A, 52B to counteract the force applied by the pressurized fluid and to prevent unseating of the valve cover 52A, 52B from the housing 24.

Figure 3:
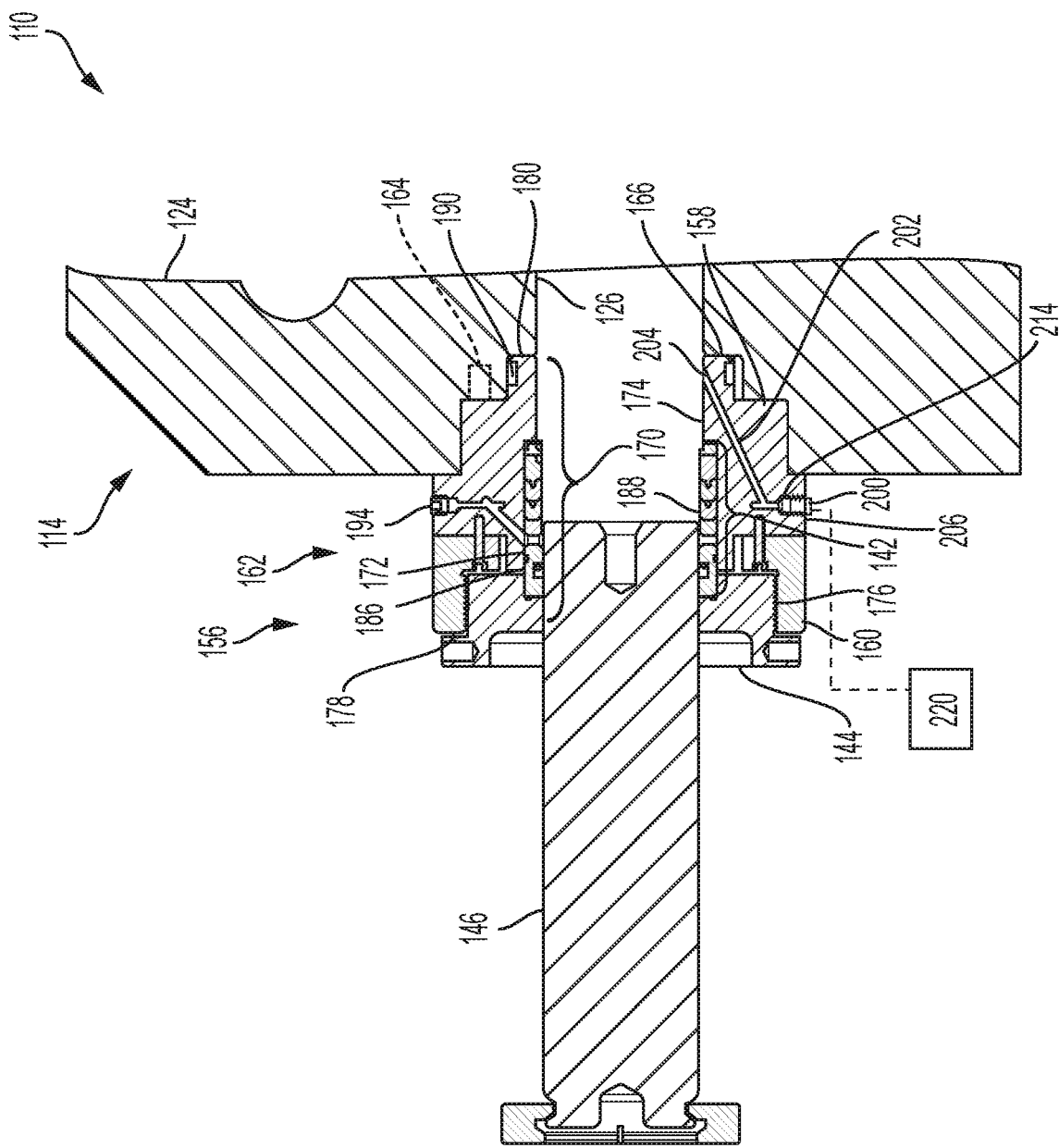
FIG. 3 is a cross-sectional view of a portion of a fluid end with a stuffing box having a pressure sensor.

FIG. 3 illustrates a cross-sectional view of a stuffing box assembly 156 coupled to a fluid end 114, though only a portion of the fluid end 114 is illustrated. The stuffing box assembly 156 includes a first stuffing box member 158 attached to the housing 124 of the fluid end 114, a second stuffing box member 160 attached to the first stuffing box member 158, and a stuffing nut 144 attached to the second stuffing box member 160. The first and second stuffing box members collectively define a stuffing box unit 162. In some embodiments, the first and second stuffing box members 158, 160 may be formed as a single stuffing box unit 162.

The stuffing box assembly 156 is a removable stuffing box assembly that is coupled to the fluid end housing 124 (e.g., via fasteners 164). Forming the stuffing box assembly 156 as a separate component from the fluid end housing 124 permits a user to replace the stuffing box assembly 156, if necessary, rather than replacing the entire fluid end 114. Further, the fluid end housing 124 can be formed from a smaller blank of material. As shown, the fluid end housing 124 defines a recess 166 into which a portion of the stuffing box assembly 156 is placed. In other embodiments, the fluid end housing 124 may define a flat, flush, exterior surface against which the stuffing box assembly 156 is placed. The stuffing box assembly 156 includes a plurality of fasteners 164 (e.g., threaded bolts) that extend through the stuffing box assembly 156 and into the fluid end housing 124 to couple the stuffing box assembly 156 to the fluid end housing 124. Additional details of a removable stuffing box assembly can be found in U.S. patent application Ser. No. 16/400,549 filed May 1, 2019, of Gardner Denver Petroleum Pumps, LLC of Tulsa, Okla., the entire contents of which are incorporated herein by reference.

The stuffing box assembly 156 includes a bore 170 (i.e., an axial bore) through which the plunger 146 reciprocates. The bore 170 extends from a first axial end 178 of the stuffing box assembly 156 (at the stuffing nut 144, when assembled) to a second axial end 180 of the stuffing box assembly 156 (at the fluid end housing 124, when assembled). The bore 170 is sized to receive the plunger 146 and plunger seals 142, and permit axial reciprocation of the plunger 146 therein. The bore 170 can be subdivided into three portions 172, 174, 176. In some embodiments, all three portions 172, 174, 176 are sized to accept the reciprocating plunger 146.

A first portion 172 of the bore is configured to receive the plurality of seals 142. The plurality of seals 142 define a packing arrangement and include, for example, lantern rings, header rings, junk rings, pressure rings, and support rings. The rings/seals that form the packing arrangement 142 are abutted against one another to form a generally cylindrical body that, at an outer periphery 186, abuts the cylindrical wall of the bore 170 at the first portion 172. An inner periphery 188 of the packing arrangement 142 seals against the plunger 146 as the plunger 146 reciprocates.

A second portion 174 of the bore 170 is located between the first portion 172 of the bore 170 and the second axial end 180 of the stuffing box assembly 156 (at the fluid end housing 124, when assembled). The second portion 174 of the bore 170 may have a decreased diameter relative to the first portion 172 as the second portion 174 does not support any seals therein. Although shown as having a consistent bore diameter, the second portion 174 may have a variable diameter and is defined as the portion of the bore 170 between the packing arrangement 142 and the fluid end housing 124. An exterior radial seal 190 (and/or a face seal) may be located on the stuffing box assembly 156 at a location surrounding or adjacent to the second portion 174 of the bore 170 to seal the stuffing box assembly 156 relative to the fluid end housing 124, though this is not a seal of the packing arrangement 142 located within the bore 170 or a seal that engages the plunger 146.

A third portion 176 of the bore 170 is located between the first portion 172 of the bore 170 and the first axial end 178 of the stuffing box assembly 156 (at the stuffing nut 144, when assembled). As shown, the third portion 176 of the bore 170 is threaded to accept the stuffing nut 144. When the stuffing nut 144 is threaded into the third portion 176, the packing arrangement 142 within the first portion 172 is axially compressed. In some embodiments, the stuffing nut 144 may be otherwise attached to the stuffing box members 158, 160 (e.g., via peripheral threaded fasteners). In such embodiments, the third portion 176 of the bore 170 may be omitted, or may be the portion of the bore 170 filled by the stuffing nut 144 when axially compressing the packing arrangement 142.

The axial bore 170 is therefore separated into first, second, and third portions 172, 174, 176, where the first portion 172 is located between the second and third portions 174, 176. When the packing arrangement 142 is positioned within the bore 170 and the stuffing nut 144 is coupled to the stuffing box members 158, 160, the interior diameter of the packing assembly 142 in the first portion 172, the bore defining the second portion 174, and the interior diameter of the packing nut 144 within the third portion 176 collectively define a passage having a relatively consistent diameter similar to the diameter of the plunger 146 such that the plunger 146 is guided in its reciprocating motion within the passage.

The second portion 174 of the bore 170 is in direct fluid communication with the fluid that is pumped through the fluid end housing 124, and is specifically in direct fluid communication with the fluid in an internal chamber 126 of the fluid end housing 124 that is between the inlet valve and the outlet valve (similar to the inlet and outlet valves 32, 38 shown in FIG. 2). This fluid is provided to the internal chamber 126 via the inlet valve (similar to the inlet valve 32), is pressurized by the reciprocating motion of the plunger 146, and is delivered from the internal chamber 126 to the outlet valve (similar to the outlet valve 38).

Measuring and recording the pressure within the fluid end 114, and specifically, the pressure of the fluid within the internal chamber 126 between the inlet and outlet valves (similar to the inlet and outlet valves 32, 38 shown in FIG. 2) can provide relevant information relating to the operation and maintenance of the pump. More particularly, measuring the pressure within the fluid end 114 can provide feedback (real-time or deferred, such as post-operation review) showing desired pressure (pressure within a prescribed range) or undesired pressure (pressure above or below the prescribed range) indicative of part degradation or failure.

As shown in FIG. 3, to determine the pressure within the fluid end housing 124, a pressure sensor 200 is positioned in fluid communication with the bore 170 of the stuffing box assembly 156. A channel 202 (i.e., a sensor channel) extends between the exterior surface 206 (i.e., outside diameter) of the first stuffing box member 158 and the interior surface (i.e., inside diameter, the bore 170) of the first stuffing box member 158. More specifically, the channel 202 extends from the exterior surface 206 of the stuffing box assembly 156 to the second portion 174 of the bore 170. As shown, the channel 202 is a linear channel extending at an angle relative to the axial direction defined by the axial bore 170. As such, the channel 202 is not parallel to the bore 170. As the channel 202 extends radially inward from the exterior surface 206 of the stuffing box assembly 156 to the second portion 174 of the bore 170, the channel 202 also extends axially toward the second end 174 of the stuffing box assembly 156 (i.e., toward the fluid end housing 124, when assembled). Therefore, the opening 204 of the channel 202 at the bore 170 is at a location in the bore 170 beyond the reciprocating range of the plunger 146 such that the plunger 146 does not cover or block the channel 202 in any position throughout its motion. In some embodiments, the channel 202 is a linear channel, defined by a linear path and formed by boring a single hole through the stuffing box assembly 156. In other embodiments, the channel 202 may be non-linear or may comprise a plurality of linear paths.

The channel 202 may be threaded at the exterior surface 206 to engage the sensor 200 and to couple the sensor 200 to the stuffing box assembly 156. Further, the channel 202 and/or the sensor 200 may be provided with a seal 214 that prevents fluid leakage from the channel 202 and past the sensor 200. In some embodiments, the seal 214 may be a radial seal or a face seal, or may otherwise be a thread seal.

Locating the pressure sensor 200 at the exterior 206 (i.e., outer diameter) of the stuffing box assembly 156 provides the opportunity to replace the sensor 200 without disassembling the stuffing box 156 or the fluid end 114. Further, by locating the channel 202 fully within the stuffing box assembly 156, and more specifically, fully within the first stuffing box member 158, if cavitation or leakage occurs at the channel 202, the stuffing box member 158 can be replaced. In contrast, if the channel 202 were formed in the fluid end housing 124 (i.e., extending to the internal chamber 126 of the fluid end housing 124), a failure at the channel 202 could result in replacement of the entire fluid end housing 124.

The pressure sensor 200 is in communication with a controller or monitoring device 220. The monitoring device 220 is programmed to monitor or record the pressure readings. In some embodiments, the monitoring device 220 may be programmed to compare the most recent pressure reading or a trend of the most pressure readings and compare the pressure reading(s) to a predefined desired pressure range. Further, the pressure reading(s) and/or the trends can also be compared to predefined or dynamically generated trends or patterns. In some embodiments, the monitoring device 220 may be programmed to store a pressure reading at a specific time interval (e.g., every second, every ten seconds, etc.) or may otherwise store a pressure reading based on the cycle of the reciprocating piston 146 or based on the position of one of the inlet or outlet valves (similar to the inlet and outlet valves 32, 38) within the fluid end housing 124. In some embodiments, the monitoring device 220 is continuously monitoring the measurements from the pressure sensor 200 and only records data that is at, above, or below a threshold value (e.g., outside of a range, etc.). In some embodiments, the monitoring device 220 may use burst recording to record the monitored data for a predetermined amount of time after a threshold value is reached. As the fluid end assembly (similar to fluid end assembly 14) may include a plurality of fluid end housings 124, each having its own respective interior volume 126, plunger 146, inlet valve and outlet valve (similar to the inlet and outlet valves 32, 38), pressure readings may also be compared to the pressure readings of other fluid end housings 124.

If the measured pressure deviates from the predefined pressure range, or otherwise deviates from a pressure measured by a pressure sensor 200 of another fluid end housing 124, the monitoring device 220 generates an alert, informing an operator of a deviation in pressure that may affect efficiency of the pump 110 and may require attention. The alert may be an illuminated light, a sound (e.g., a buzzer), a relay, or may be a digital alert (e.g., an electrical signal) or communication provided to a control room.

Figure 4:
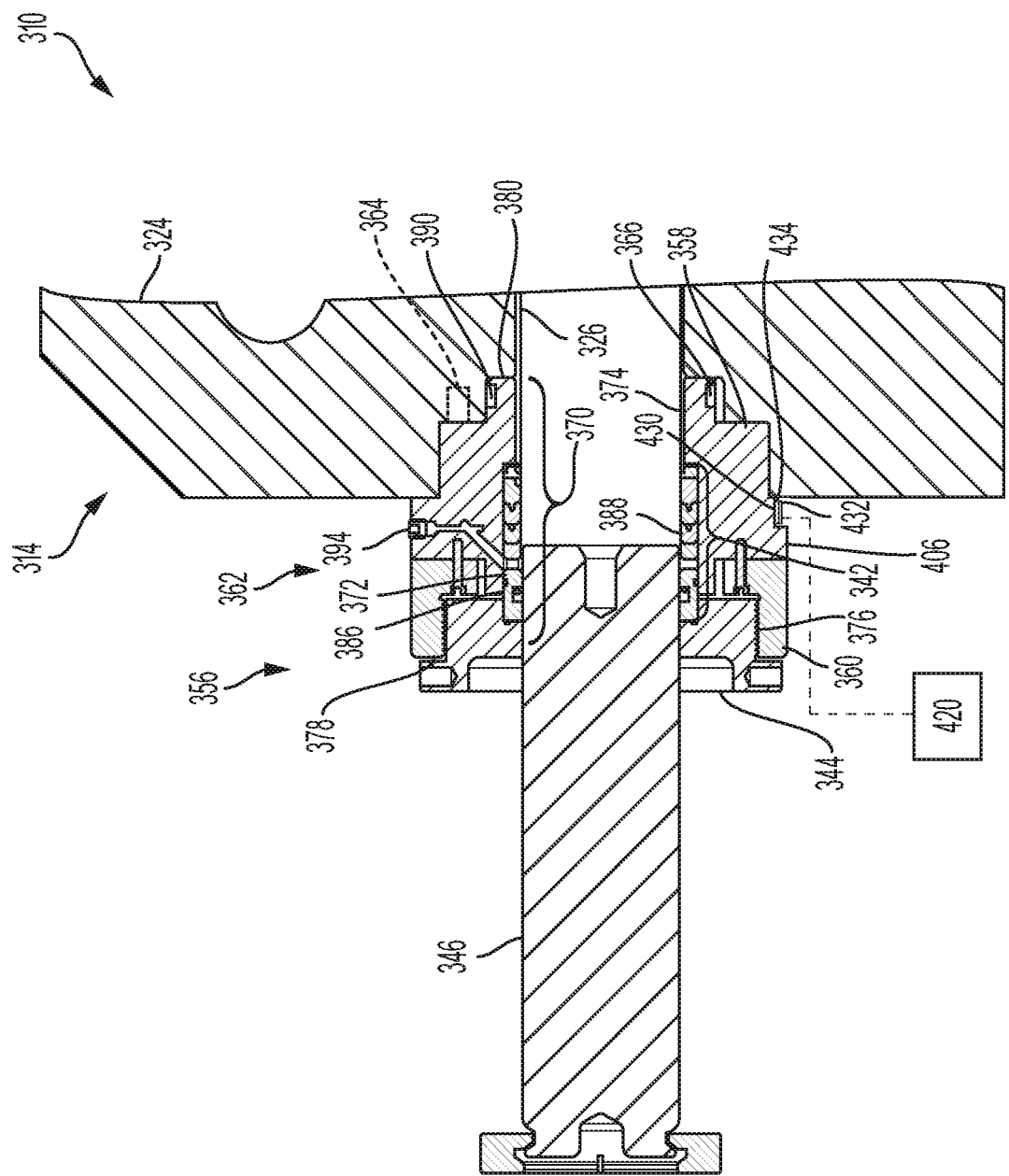
FIG. 4 is a cross-sectional view of a portion of a fluid end with a stuffing box having a strain gage.

FIG. 4 illustrates a cross-sectional view of a stuffing box assembly 356. Like elements are labeled with similar reference numerals to those with reference to FIG. 3, incremented by 200. In contrast to the embodiment shown in FIG. 3 and described above, the stuffing box assembly 356 does not include a channel through which a pressure sensor is in fluid communication with the fluid in the second portion 374 of the bore 370. Rather, the cylindrical exterior surface 406 of the first stuffing box unit 362 includes a flat 430 (e.g., a machined flat) and a strain gage 432 mounted to the flat 430. The flat 430 is located adjacent the second portion 374 of the bore 370 while still externally accessible when the stuffing box assembly 356 is coupled to the fluid end housing 324. The flat 430 is therefore not constrained or in abutment against the fluid end housing 324. The flat 430 is a secant cut into the cylindrical outer surface or diameter 406 of the first stuffing box member 358, defining a planar surface oriented perpendicular to a radial direction of the stuffing box member 358.

The strain gage 432 is mounted to the flat 430, for example, via an adhesive 434 or via mechanical means (e.g, threaded fasteners, etc.). The strain gage measures an applied force via a change in resistance. The applied force is directly proportional to the pressure within the second portion 374 of the stuffing box bore 370 and specifically, the pressure between the plunger 346 and the interior volume 326 of the fluid end housing 324. The measured resistance is relayed to the monitoring device 420, where the measurement is converted to a pressure indicative of the pressure within the second portion 374 of the bore 370. As discussed above with respect to FIG. 3, the measured and calculated pressure is compared to one or both of a predefined pressure range or the measured pressure within other fluid end and stuffing box assemblies 314, 356 via the monitoring device 420. Deviations in pressure may result in an alarm or other signal for alerting an operator of a deviation in pressure that may affect efficiency of the pump 314 and may require attention.

The pressure sensor 200 and the strain gage 432 are sensing means configured to determine a fluid pressure within the second portion 374 of the bore 370. The pressure measured and calculated by the sensing means is provided to the monitoring device 220, 420 where it is compared to a desired pressure range and/or other pressure readings (of the fluid end 114, 314, of other fluid ends 114, 314).

Various features and advantages of the invention are set forth in the following claims.

What is claimed is:

1. A stuffing box assembly for a fluid end of a hydraulic fluid pump, the stuffing box assembly comprising:
 a stuffing box unit having a plunger bore configured to receive a plunger of the hydraulic fluid pump and a plurality of seals, wherein the plunger includes a plunger end that enters an interior volume of a fluid end housing during operation of the hydraulic fluid pump, wherein the plunger bore extends from a first axial end of the stuffing box unit to a second axial end of the stuffing box unit, the second axial end being positionable adjacent the interior volume of the fluid end housing, and wherein the plunger bore includes a first portion configured to receive the plurality of seals and a second portion extending between the first portion and the second axial end; and a sensor coupled to the stuffing box unit and configured to determine a fluid pressure within the second portion of the stuffing box unit.

2. The stuffing box assembly of claim 1, wherein the sensor is a pressure sensor in fluid communication with a fluid within the second portion of the plunger bore.

3. The stuffing box assembly of claim 1, wherein the sensor is a strain gage coupled to the stuffing box unit and configured to detect a value indicative of the fluid pressure within the second portion of the stuffing box unit.

4. The stuffing box assembly of claim 3, wherein the stuffing box unit includes a flat cut into a cylindrical outer surface of the stuffing box unit, wherein the flat cut defines a planar surface oriented perpendicular to a radial direction of the stuffing box unit, and wherein the strain gage is coupled to the flat cut.

5. The stuffing box assembly of claim 1, wherein the stuffing box assembly includes a cylindrical outer surface, and wherein a channel extends from the cylindrical outer surface to the second portion of the plunger bore, and wherein the sensor is coupled to the channel at the cylindrical outer surface.

6. The stuffing box assembly of claim 5, wherein the interior volume of the fluid end housing is defined between an inlet valve and an outlet valve, and wherein the channel is defined entirely by the stuffing box unit and does not extend through the fluid end housing.

7. The stuffing box assembly of claim 5, wherein an opening of the channel at the second portion of the plunger bore is located axially nearer the second axial end of the plunger bore than the sensor.

8. The stuffing box assembly of claim 1, wherein the fluid pressure that is determined by the sensor is representative of a pressure within the interior volume of the fluid end housing.

9. The stuffing box assembly of claim 1, wherein the plunger bore further comprises a third portion, wherein the first portion is located between the second portion and the third portion, and wherein the third portion is threaded.

10. The stuffing box assembly of claim 9, further comprising a stuffing nut, wherein the stuffing nut is threaded and configured to engage the third portion of the plunger bore, and wherein the stuffing nut is configured to compress the plurality of seals within the first portion.

11. The stuffing box assembly of claim 1, further comprising a monitoring device programmed to record the fluid pressure determined by the sensor and to compare the fluid pressure to a predefined pressure range or a previously measured fluid pressure.

12. A stuffing box assembly for a fluid end of a hydraulic fluid pump, the stuffing box assembly comprising:
a stuffing box unit having an axial bore, wherein the axial bore is defined by a first portion configured to support a plurality of seals, a second portion configured to be positioned adjacent an interior volume of a fluid end housing into which an end of a plunger extends during operation of the hydraulic fluid pump, and a third portion configured to engage a stuffing nut, wherein the first portion is positioned between the second portion and the third portion, and
sensing means configured to determine a fluid pressure within the second portion of the axial bore.

13. The stuffing box assembly of claim 12, wherein the stuffing box unit is configured to be removably coupled to the fluid end housing and the interior volume is defined between an inlet valve and an outlet valve.

14. The stuffing box assembly of claim 13, wherein the sensing means is coupled to an outer surface of the stuffing box unit, and wherein the sensing means is accessible when the stuffing box unit is removably coupled to the fluid end housing.

15. The stuffing box assembly of claim 12, wherein the third portion of the axial bore extends between a first axial end of the stuffing box unit and the first portion of the axial bore, and wherein the second portion extends between a second axial end of the stuffing box unit and the first portion of the axial bore.

16. The stuffing box assembly of claim 12, further comprising a monitoring device programmed to monitor or record the fluid pressure determined by the sensing means and to compare the fluid pressure to a predefined pressure range, a predefined pattern of pressures, a dynamically generated pattern of pressures, or a previously measured fluid pressure.

17. A stuffing box assembly for a fluid end of a hydraulic fluid pump, the stuffing box assembly comprising:
a stuffing box unit having an axial bore configured to support a plurality of seals in a first portion, wherein the axial bore includes a second portion axially spaced apart from the first portion so that the second portion can be positioned adjacent an interior volume of a fluid end housing into which an end of a plunger extends during operation of the hydraulic fluid pump, and wherein the stuffing box unit further comprises a channel branching from the axial bore at the second portion, and
a sensor in fluid communication with the channel and configured to determine a fluid pressure within the second portion of the stuffing box unit.

18. The stuffing box assembly of claim 17, wherein the stuffing box unit is configured to be removably coupled to the fluid end housing and the interior volume is defined between an inlet valve and an outlet valve, and wherein the sensor is in fluid communication with the interior volume via the channel.

19. The stuffing box assembly of claim 17, wherein an opening of the channel at the second portion of the axial bore is located axially nearer an axial end of the axial bore than the sensor.

20. The stuffing box assembly of claim 19, wherein the plunger is a reciprocating plunger that reciprocates within a reciprocating range, and wherein the opening of the channel at the second portion of the axial bore is located outside of the reciprocating range.

* * * * *